(12) United States Patent
Perez

(10) Patent No.: US 8,239,436 B2
(45) Date of Patent: Aug. 7, 2012

(54) ESTIMATING A SIGNAL BASED ON SAMPLES DERIVED FROM DOT PRODUCTS AND RANDOM PROJECTIONS

(75) Inventor: Eduardo Perez, Austin, TX (US)

(73) Assignee: National Instruments Corporation, Austin, TX (US)

( * ) Notice: Subject to any disclaimer, the term of this patent is extended or adjusted under 35 U.S.C. 154(b) by 987 days.

(21) Appl. No.: 12/236,786

(22) Filed: Sep. 24, 2008

(65) Prior Publication Data
US 2010/0077016 A1 Mar. 25, 2010

(51) Int. Cl.
*G06F 17/14* (2006.01)
*G06F 7/52* (2006.01)

(52) U.S. Cl. ........ 708/400; 708/404; 708/250; 708/251; 382/100; 382/165; 707/722; 707/737

(58) Field of Classification Search .................. 708/250, 708/251, 400, 404; 707/737, 722; 382/100, 382/165
See application file for complete search history.

(56) References Cited

U.S. PATENT DOCUMENTS

| | | | |
|---|---|---|---|
| 6,567,083 B1 * | 5/2003 | Baum et al. .................. | 345/426 |
| 7,271,747 B2 | 9/2007 | Baraniuk et al. | |
| 7,399,957 B2 | 7/2008 | Parker et al. | |
| 7,436,911 B2 | 10/2008 | Fudge et al. | |
| 7,436,912 B2 | 10/2008 | Fudge et al. | |
| 7,511,643 B2 | 3/2009 | Baraniuk et al. | |
| 7,697,658 B2 | 4/2010 | Wang et al. | |
| 7,783,459 B2 | 8/2010 | Rozell et al. | |
| 7,895,194 B2 * | 2/2011 | Indyk et al. .................. | 707/722 |
| 2006/0239336 A1 | 10/2006 | Baraniuk et al. | |
| 2007/0027656 A1 | 2/2007 | Baraniuk et al. | |
| 2007/0081578 A1 | 4/2007 | Fudge et al. | |
| 2007/0086544 A1 | 4/2007 | Fudge et al. | |
| 2007/0239968 A1 * | 10/2007 | Moyer et al. .................. | 712/221 |
| 2008/0129560 A1 | 6/2008 | Baraniuk et al. | |
| 2008/0219579 A1 | 9/2008 | Aksyuk et al. | |
| 2008/0228446 A1 | 9/2008 | Baraniuk et al. | |
| 2008/0270055 A1 | 10/2008 | Rozell et al. | |
| 2009/0196393 A1 | 8/2009 | Wang et al. | |

(Continued)

OTHER PUBLICATIONS

Richard G. Baraniuk; "Compressive Sensing"; IEEE Signal Processing Magazine, Jul. 2007; 4 pages.

(Continued)

*Primary Examiner* — Tammara Peyton
(74) *Attorney, Agent, or Firm* — Meyertons Hood Kivlin Kowert & Goetzel, P.C.; Jeffrey C. Hood; Mark K. Brightwell

(57) ABSTRACT

A system and method for estimating a signal based on a stream of randomly generated samples. The method includes: (a) receiving a sample; (b) generating a sampling vector; (c) multiplying the sample and the sampling vector to obtain a current back projection; (d) computing a first intermediate vector that represents an average of the current back projection and previous back projections; (e) transforming the first intermediate vector to determine a second intermediate vector; (f) identifying locations where the second intermediate vector attains its k largest values; (g) computing an estimate for the transformation of the signal by solving a system of equations based on the identified locations, the received sample value, previously received sample values, the sampling vector and previously generated sampling vectors; (h) inverse transforming the transformation estimate to determine an estimate of the signal; and (i) storing the signal estimate.

5 Claims, 11 Drawing Sheets

U.S. PATENT DOCUMENTS

| | | |
|---|---|---|
| 2009/0196513 A1 | 8/2009 | Tian et al. |
| 2009/0222226 A1 | 9/2009 | Baraniuk et al. |
| 2010/0001901 A1 | 1/2010 | Baraniuk et al. |
| 2010/0046829 A1 | 2/2010 | Mahajan et al. |
| 2010/0066493 A1 | 3/2010 | Rachlin |
| 2010/0080473 A1 | 4/2010 | Han et al. |
| 2010/0103309 A1 | 4/2010 | Stern |
| 2010/0290529 A1 | 11/2010 | Topiwala |

OTHER PUBLICATIONS

Richard Baraniuk, Justin Romberg, and Robert Nowak; "Compressive Sensing: A New Framework for Imaging"; 2007; 136 pages.

Petros T. Boufounos and Richard Baraniuk; "1-Bit Compressive Sensing"; Conference on Information Sciences and Systems (CISS), Princeton, New Jersey, Mar. 2008; 6 pages.

Emmanuel J. Candés; "Compressive Sampling"; Proceedings of the International Congress of Mathematicians, Madrid, Spain, 2006; 20 pages.

Emmanuel Candés and Justin Romberg; "Sparsity and Incoherence in Compressive Sampling"; Nov. 2006; 20 pages.

Justin Romberg and Michael Wakin; "Compressed Sensing: A Tutorial"; IEEE Statistical Signal Processing Workshop; Aug. 26, 2007; 128 pages.

Terence Tao; "Compressed Sensing and Single-Pixel Cameras"; Apr. 13, 2007; 47 pages.

Yair Weiss, Hyun Sung Chang, and William T. Freeman; "Learning Compressed Sensing", 45th Allerton Conference on Communication, Control, and Computing, from the 45th Allerton Conference was held on Sep. 26-28, 2007, pp. 1-7.

* cited by examiner

```
201:    X = AcquireSignal(N)

202:    Send(N)
203:    Send(S)
204:    Send(P)
205:    Send (k)

206:    Set_Seed(S)

207:    do {
208:       r = random(N, P)
209:       m = dotProduct(X,r)
210:       if (m != 0) Send(m)
211:    } while (Get(Acquire_Sample))
```

Fig. 2

```
310:    Get(N)
311:    Get(S)
312:    Get(P)
313:    Get(k)

314:    Set_Seed(S)

315:    i = 0
316:    w = 0
317:    Q = 0.43
318:    Acquire_Sample = TRUE

319:    do {
320:        y[i] = Get(m)
321:        R[i] = random(N, P)
322:        b = CountOnes( R[i] )
323:        pr = b / N
324:        w = w + y[i] * R[i] / (pr − pr*pr)
325:        u = w / (i + 1)
326:        i = i + 1
327:        t = T(u)
328:        J = IndexRank(t,k)
329:        v = SuppressNoise(t,J)
330:        g = Inverse_Transform(v)
331:        f = dotProduct(g, R[i])
332:        d = separation(f, y[i])
333         if (d<Q) { Acquire_Sample=FALSE }
334         Send(Acquire_Sample)
335:    } while(Acquire_Sample)

336:    a = LinearSolve(y, R, J)
337:    h = Vectorize(a,J)
338:    Xest = Inverse_Transform(h)
339:    Store Xest
```

Fig. 3

Matrix Equation $$\begin{bmatrix} y[i] \\ y[i-1] \\ y[i-2] \\ \ldots \\ y[i-k+1] \end{bmatrix} = \begin{bmatrix} L_0 \\ L_1 \\ L_2 \\ \ldots \\ L_{k-1} \end{bmatrix} \begin{bmatrix} a_{j_0} \\ a_{j_1} \\ a_{j_2} \\ \ldots \\ a_{j_{k-1}} \end{bmatrix}$$

Fig. 4 computer system 782

ESTIMATING A SIGNAL BASED ON SAMPLES DERIVED FROM DOT PRODUCTS AND RANDOM PROJECTIONS

FIELD OF THE INVENTION

The present invention relates to the field of signal estimation, and more particularly to a system and method for estimating a signal based on a series of single samples that are derived from random sampling and projections of the signal.

DESCRIPTION OF THE RELATED ART

Nyquist theory states that a band-limited signal may be reconstructed from its samples provided those samples are obtained at a sufficiently high rate, i.e., the Nyquist rate. Thus, a processing system may start its analysis of a signal by sampling that signal at or above the Nyquist rate. The set of samples thereby obtained may be sufficiently large that storage and/or transmission of the sample set may require a nontrivial amount of time, especially when dealing with low bandwidth channels. Thus, there exists a substantial need for systems and methods capable of encoding signals into smaller sets of data so that the signals may be reconstructed or at least estimated from the smaller sets of data.

SUMMARY

In one set of embodiments, a method for estimating a signal may involve the following operations. First, a sample value is received, where the sample value is derived from a signal X. Second, a sampling vector that corresponds to the sample value is generated. Third, the sample value and the sampling vector are multiplied to obtain a current back projection. Fourth, a first intermediate vector that represents an average (e.g., a weighted average) of the current back projection and previous back projections is computed. Fifth, a transformation is applied to the first intermediate vector to determine a second intermediate vector. Sixth, a set of locations where the second intermediate vector attains its k largest values (e.g., in terms of absolute value) is identified. (k is a positive integer.) Seventh, an estimate for the transformation of the signal is computed by solving a system of equations based on the set of locations, the received sample value, previously received sample values, the sampling vector and previously generated sampling vectors. Eighth, an inverse of the transformation is applied to said estimate for the transformation to determine an estimate of the signal. Ninth, the signal estimate is stored in a memory.

In one embodiment, the system of equations is a k×k linear system of equations, where the k×k linear system of equations is based on: the set of locations, the received sample value; k−1 previously received sample values; the sampling vector; and k−1 previously generated sampling vectors.

In one embodiment, the sampling vector is a random vector having binary values, e.g., a vector generated by repeated use of a random number generator.

In one embodiment, the sampling vector is a low discrepancy sequence having binary values.

In some embodiments, the signal X is a zero-mean signal.

In various embodiments, the signal may be an image, an audio signal, a video signal, a signal obtained from a measurement process, a signal generated by computer simulation, a communication signal, a seismic signal, etc.

In one embodiment, the above-described method may also include the act of displaying a graphical representation of the signal estimate via a display device (e.g., a monitor, television, a projector, a head-mounted signal, a liquid crystal display, a plasma display, etc.).

In one embodiment, the above-described method may also include the act of providing the signal estimate to an audio output device for conversion into an audio output signal.

In one embodiment, the above-described method may also include: operating on the signal estimate to extract information from the signal estimate; and providing the information to an output device.

In one set of embodiments, a computer-readable memory medium stores program instructions that are executable by one or more processors to: (a) receive a data value, where the data value provides information regarding a signal to be estimated; (b) generate a random vector that corresponds to the data value; (c) multiply the data value and the sampling vector to obtain a current back projection; (d) compute a first intermediate vector that represents an average (e.g., a weighted average) of the current back projection and previous back projections; (e) apply a transformation to the first intermediate vector to determine a second intermediate vector; (f) identify a set of index positions where the second intermediate vector attains its k largest values in terms of absolute value, where k is a positive integer; (g) compute an estimate for the transformation of the signal by solving a system of equations based on the set of index positions, the received data value, previously received data values, the sampling vector and previously generated sampling vectors; (h) apply an inverse of the transformation to said estimate for the transformation to determine an estimate of the signal; and (i) store the estimate of the signal in memory.

In one embodiment, the transformation is a discrete Fourier transformation. In another embodiment, the transformation is a discrete cosine transformation. In yet another embodiment, the transformation is a Gabor transformation. In yet another embodiment, the transformation is a wavelet transformation.

In one embodiment, the transformation of the signal has no more than k non-zero values.

In one embodiment, the transformation is a linear transformation corresponding to a nonsingular N×N matrix, where N is the number of elements (i.e., components) in the signal.

In some embodiments, the signal is a zero-mean signal.

In one set of embodiments, a computer system for estimating a signal may include a processor and memory. The memory stores program instructions that are executable by the processor to: (a) receive a data value, where the data value provides information regarding a signal to be estimated; (b) multiply the data value and a corresponding sampling vector to obtain a current back projection; (c) compute a first intermediate vector that represents an average of the current back projection and previous back projections; (d) apply a transformation to the first intermediate vector to determine a second intermediate vector; (e) identify a set of index positions where the second intermediate vector attains its k largest values in terms of absolute value, where k is a positive integer; (f) compute a fourth intermediate vector by applying an inverse of the transformation to the third intermediate vector; (g) compute a dot product of the fourth intermediate vector with the random vector; (h) repeat (a) through (h) until a separation between the dot product and the corresponding data value smaller than a threshold value; (k) compute an estimate of the signal using the set of index positions, the received data value, previously received data values, the sampling vector and previous sampling vectors; and (l) store the signal estimate in the memory.

In one embodiment, the operation (k) includes: computing an estimate for the transformation of the signal by solving a system of equations based on the set of index positions, the received data value, the previously received data values, the sampling vector and the previous sampling vectors; and applying the inverse of the transformation to said estimate for the transformation to determine the estimate of the signal.

In one embodiment, the separation between the dot product and the corresponding data value is a percentage difference between the dot product and the corresponding data value.

In one embodiment, the transformation of the signal is k-sparse, i.e., has at most k non-zero components.

In some embodiments, the signal is a zero-mean signal.

In one embodiment, the program instructions are executable to display a graphical representation of the signal estimate via a display device.

BRIEF DESCRIPTION OF THE DRAWINGS

A better understanding of the present invention can be obtained when the following detailed description of the preferred embodiment is considered in conjunction with the following drawings.

FIG. 2 illustrates one embodiment of pseudo code for generating samples of the signal X at the transmitter.

FIG. 3 illustrates one embodiment of pseudo code for computing an estimate of the signal X at the receiver.

FIG. 4 illustrates one embodiment of a matrix equation for estimating the nonzero values of T(X), where T(X) is transform of signal X under a given transformation T.

Figure 1:
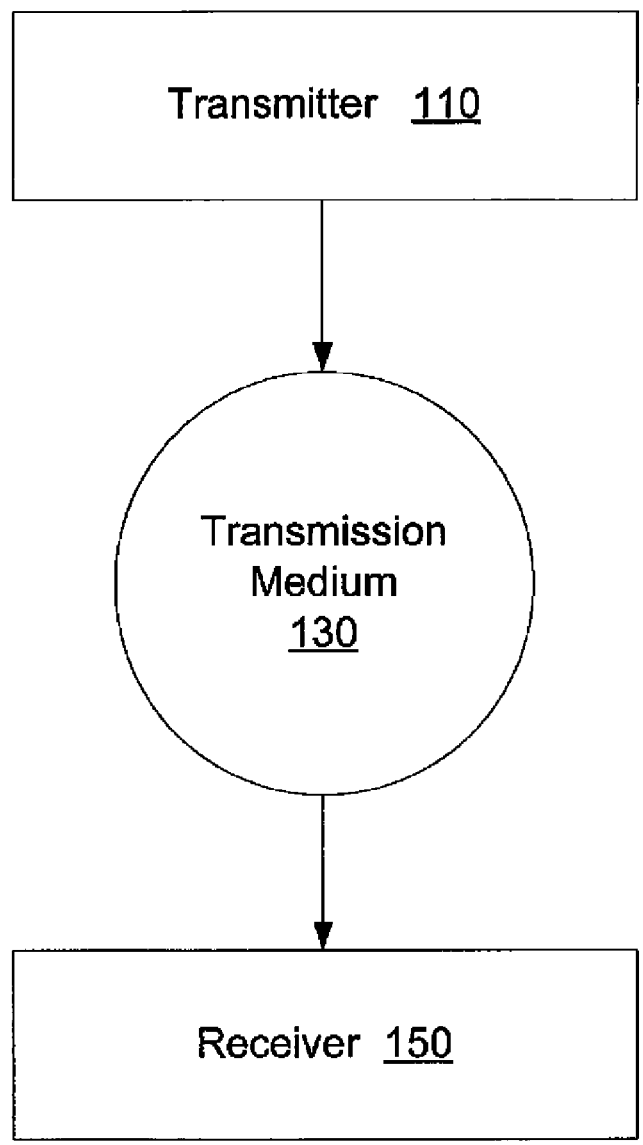
FIG. 1 illustrates one embodiment of a system for sampling a signal X at a transmitter and then reconstructing an estimate for the signal at a receiver.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Terminology

The following is a glossary of terms used in the present application.

Memory Medium—Any of various types of memory devices or storage devices. The term "memory medium" is intended to include an installation medium, e.g., a CD-ROM, a floppy disk, or a tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. The term "memory medium" may include two or more memory media which may reside at different locations, e.g., at different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical Program—A program comprising a plurality of interconnected nodes or icons, where the plurality of interconnected nodes or icons visually indicate functionality of the program. A graphical program is a type of diagram.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE from Measurement Computing, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others.

The term "graphical program" includes models or block diagrams created in graphical modeling environments, where the model or block diagram comprises interconnected nodes or icons that visually indicate operation of the model or block diagram; exemplary graphical modeling environments include Simulink, SystemBuild, VisSim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Data Flow Graphical Program (or Data Flow Diagram)—A graphical program or diagram comprising a plurality of interconnected nodes, where the connections between the nodes indicate that data produced by one node is used by another node.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes (sub-VIs), terminal nodes, structure nodes, etc. Nodes may be connected together in a graphical program by connection icons or wires.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), where the individual GUI Elements or windows may optionally be tiled together.

A GUI may be associated with a diagram, e.g., a graphical program. In this instance, various mechanisms may be used to connect GUI Elements in the GUI with nodes or icons in the diagram/graphical program. For example, when Input Controls and Output Indicators are created in the GUI, corresponding nodes (e.g., terminals) may be automatically created in the diagram or graphical program. Alternatively, the user can place terminal nodes in the diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program or diagram, and view output of the program or diagram, during execution.

A front panel is a type of GUI. A front panel may be associated with a diagram or graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators Input Control—a graphical user interface element for providing user input to a program. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, laptop, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card, a video capture board, a smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Signal Sampling and Estimation

In one set of embodiments, a system 100 for sampling a signal and then computing an estimate for the signal may be arranged as illustrated in FIG. 1. The system 100 includes a transmitter 110 and a receiver 130 that are coupled through a communication medium 130. The transmitter 110 is configured to acquire a signal X, generate a series of values based on the signal X, and to transmit the series of values to the receiver 150 via the communication medium 130. The receiver 150 is configured to receive the series of values, and to generate the estimate for the signal X based on the series of values.

The receiver and the transmitter each have hardware sufficient for communicating through the communication medium 130.

The communication medium 130 may be realized by any of a wide of variety of known mechanisms for the communication of information or any combination of such mechanisms. For example, in one embodiment, the transmission medium 130 may be a computer network such as a local area network (LAN), a wide area network (WAN), or the Internet. The communication medium 130 may include any number of connections, e.g., wired connections, wireless connections, connections based on the transmission of signals through the atmosphere, optical connections (including laser-based connections), acoustic signal connections, etc.

In one embodiment, the transmitter 110 may be configured to perform computational operations based on the pseudo code given in FIG. 2. As indicated at line 201, the transmitter may acquire a signal X having N samples. Thus, the signal X may be interpreted as being a vector having N elements. The signal X is assumed to belong to a class of signals C(T,k) corresponding to a given positive integer k and a given transformation T on N-dimensional space. The class C(T,k) is defined by the condition that T(X) has no more than k non-zero elements, where T(X) is the transform of X under the transformation T.

As indicated at lines 202-205, the transmitter 110 may send parameters N, S, P and k to the receiver 150. S is a seed value for the generation of random numbers. P is a probability value to be used for the random number generation.

As indicated at line 206, transmitter 110 may initialize a random number generator using the seed value S.

As indicated at lines 207-211, the transmitter 110 may repeatedly perform a sampling process. Each repetition of the sampling process results in the generation of a corresponding sample m and the transmission of that sample to the receiver 150. The sampling process may be repeated until the receiver signals that it does not need any more samples. For example, as indicated at line 211, the transmitter may receive an Acquire_Sample flag from the receiver. If the Acquire_Sample flag has the value "True", the transmitter may perform another iteration of the sampling process. Alternatively, if the Acquire_Sample flag has the value "False", the transmitter may stop iterating.

As indicated at lines 208-210, the sampling process includes: the generation of a random vector r having N elements; the computation of a dot product between signal vector X and random vector r to determine the sample m; and the transmission of the sample m to the receiver (provided the sample m is nonzero). The random vector r is a binary vector, i.e., a vector whose elements are binary values. As indicated at line 208, the transmitter generates the random vector using the random number generator. The random number generator is configured so that each element r(j) of the random vector r has a probability P of being assigned the value one and probability 1−P of being assigned the value zero.

In one embodiment, the receiver 150 may be configured to perform computational operations based on the pseudo code given in FIG. 3. As indicated at lines 310-313, the receiver may receive the parameter values N, S, P and k transmitted by the transmitter 110. As indicated at line 314, the receiver initializes a random number generator using the seed value S. As indicated at line 315 and 316, the receiver initializes an iteration index i and an accumulation vector w. As indicated at lines 317 and 318, the receiver sets the threshold Q to a constant and the Acquire_Sample flag to TRUE. In the illustrated example, the threshold is set to 0.43. However, it should be noted that the threshold may be set to any desired value with the understanding that a smaller value for the threshold may result in higher estimation accuracy but a larger number of iterations on average, while a larger value for the threshold may result in lower estimation accuracy but few iterations on average. In one set of embodiments, the threshold is set to a value in the range (0,1).

As indicated at lines 319-335, the receiver repeatedly performs the computations corresponding to lines 320-334 until a termination condition is achieved.

As indicated at line 320, the receiver may receive a sample m from the transmitter and store the sample as value y[i], i.e., as the $i^{th}$ element of vector y.

As indicated at line 321, the receiver may generate a random vector R[i] using the random number generator. The random number generator is configured so that the random vector R[i] generated at line 321 is identical to the random vector r that was used by the transmitter to generate the received sample m.

As indicated at line 322, the receiver may count the number of ones that occur in the random vector R[i]. Let b represent this count value.

As indicated at line 323, the receiver may compute a probability value pr according to the expression pr=b/N. The value pr may be interpreted as a "realized probability" that an element of vector R[i] is equal to one.

As indicated at line 324, the receiver may: compute a back projection by multiplying the sample y[i] and the random vector R[i]; scale the back projection by 1/(pr−pr*pr); and accumulate the scaled back projection into the accumulation vector w. In one alternative embodiment, the back projection may be scaled by 1/(P−P*P) instead of 1/(pr−pr*pr). In this case, the computation of b and pr (lines 322 and 323) may be omitted. In another alternative embodiment, the scaling operation is omitted, i.e., w=w+y[i]*R[i].

As indicated at line 325, the receiver may compute a vector u by dividing the accumulation vector w by the iteration number (i+1).

Observations: It can be shown that vector u converges to original signal vector X as the iteration index increases. Furthermore, the transform T(u) converges to T(X). But T(X) is a vector having at most k non-zero elements by the hypothesis that X is in class C(T,k). Thus, even before the distance between T(u) and T(X) gets small, T(u) will begin to reveal the at most k index locations where T(X) attains non-zero values. Having an estimate for these index locations, one may use the received samples and their corresponding random vectors to immediately compute an estimate for the non-zero values of transform vector T(X). Thus, one can "jump ahead" and get an estimate for T(X) without waiting for u to converge to X (or for T(u) to converge to T(X)).

As indicated at line 326, the receiver may increment the iteration index i.

As indicated at line 327, the receiver may apply the transformation T to the vector u to obtain a transform vector t.

As indicated at line 328, the receiver may operate on the transform vector t to determine the k index locations $j_0, j_1, j_2, \ldots, j_{k-1}$, where $j_0 \neq j_1 \neq j_2 \neq \ldots \neq j_{k-1}$, and where the transform vector t achieves its k largest values in terms of absolute value. In other words, the receiver may compute the absolute value |t(j)| for every element t(j) of vector t; and select the index locations $j_0, j_1, j_2, \ldots, j_{k-1}$ that achieve the k largest of the absolute values |t(j)|. Let J denote this set of index locations, i.e., $J = \{j_0, j_1, j_2, \ldots, j_{k-1}\}$. The set J is an estimate of the at most k index locations where transform T(X) has non-zero values.

In some embodiments, the receiver may set to zero any element in vector t that corresponds to a DC signal component. For example, in embodiments where the transformation T is the Discrete Fourier Transform, the receiver may set to zero the element that corresponds to zero frequency.

As indicated at line 329, the receiver may generate a vector v from the vector t according to the rule: v(j)=t(j) if j in J; v(j)=0 otherwise. Thus, v agrees with t on set index set J and equals zero elsewhere. In one embodiment, the receiver may generate vector v "in place" merely by setting to zero the elements t(j) where j is outside of set J.

As indicated at line 330, the receiver may compute a vector g by applying the inverse transformation $T^{-1}$ to the vector v: $g = T^{-1}v$.

As indicated at line 331, the receiver may generate a scalar value f by computing the dot product of the vector g and the random vector R[i].

As indicated at line 332, the receiver may compute a value d indicating the amount of separation between the scalar value f and sample y[i]. Any of a wide variety of methods are contemplated for computing the value d. For example, in one embodiment, the separation value d is computed according to the relation: d=|f−y[i]|/|y[i]|, where |*| denotes the absolute value operator. In other embodiments, the separation value d is computed according to the relation: d=|f−y[i]|.

As indicated at line 333, the receiver may compare the separation value d to the threshold Q. If the separation value is less than (or, in an alternative embodiment, "≦") the threshold Q, the receiver may set the Acquire_Sample flag equal to FALSE indicating that it doesn't need any more samples. In one embodiment, the threshold Q may be specified by user input.

As indicated at line 334, the receiver may send the Acquire_Sample flag to the transmitter 110.

As indicated at line 335, the receiver may perform another iteration of the lines 320-334 if the Acquire_Sample flag is TRUE; otherwise the receiver may quit iterating and continue with line 336.

As indicated at line 336, the receiver may compute an estimate for the non-zero values in T(X) by solving a system of equations based on: at least a subset of the received samples y[i], y[i−1], y[i−2], ... y[0]; at least a subset of the random vectors R[i], R[i1], R[i−2], ... R[0]; and the index location set J. For example, in one embodiment, the receiver may compute a set of k coefficient values $a_j$, j∈J, by solving the linear system given by:

$$y[n] = R[n] \cdot T^{-1}\left(\sum_{j \in J} a_j e_j\right),$$

$$n = i, (i-1), (i-2), \ldots, (i-k+2), (i-k+1),$$

where the small dot interposed between R[n] and the summation is the dot product operator. The vector $e_j$ is the N-dimensional vector whose $j^{th}$ element is one, and whose remaining elements are zero. This linear system may be equivalently described in terms of a matrix equation as shown in FIG. 4, where the k-dimensional vectors $L_0, L_1, L_2, \ldots, L_{k-1}$ are computed by multiplying each of the random vectors R[i], R[i−1], R[i−2], ... R[0] by the matrix representation of $T^{-1}$ to determine respective resultant vectors, and then restricting the resultant vectors to the index location set J.

The receiver may use any of a variety of known methods for solving the linear system of equations.

In some embodiments, the system of equations may include more than k equations. Thus, the system may be solved by an optimization. For example, given that the system of equations is a matrix equation of the form La=y, where L is a matrix with k columns and more than k rows, the receiver may search for a solution vector a that minimizes $\|La-y\|$, where $\|*\|$ denotes a vector norm, e.g., the Euclidean norm or $L^0$ norm or $L^1$ norm or $L^{infinity}$ norm.

As indicated at line 337, the receiver may generate an N-dimensional vector h according to the expression $$h = \sum_{j \in J} a_j e_j.$$

In other words, h is the vector generated by setting element h[j] equal to $a_j$ if j is in J and equal to zero otherwise.

As indicated at line 338, the receiver may compute an N-dimensional vector $X_{est}$ by applying the inverse transformation $T^{-1}$ to the vector h: $X_{est} = T^{-1}h$. The vector $X_{est}$ is an estimate for the original signal X. Thus, the vector $X_{est}$ will also be referred to herein as the signal estimate $X_{est}$.

As indicated at line 339, the receiver may store the signal estimate $X_{est}$ in a memory medium (e.g., in semiconductor RAM and/or magnetic disk), e.g., for later retrieval and/or analysis.

In one embodiment, the receiver may display (or direct the display) of a visual representation of the signal estimate $X_{est}$ via a display device. For example, the visual representation may be a graph of the signal estimate $X_{est}$ as a function of the index location j, or a graph of some portion of the signal estimate $X_{est}$.

In another embodiment, the receiver may provide the signal estimate $X_{est}$ to an audio output device so that the signal estimate $X_{est}$ may be converted to an audio output signal.

In another embodiment, the receiver may provide (or transmit) the signal estimate $X_{est}$ to a signal processor. The signal processor may operate on the signal estimate $X_{est}$ to extract useful information therefrom. For example, the signal processor may demodulate and/or decode the signal estimate $X_{est}$. The extracted information may be stored and/or forwarded to another processing agent and/or displayed via a display device.

In some embodiments, the above-described methodology for estimating the signal X may utilize fewer of the values m (i.e., fewer iterations of line 320) than would be required by Nyquist reconstruction of the signal X. This property may be useful in situations where the communication medium 130 has a low transmission bandwidth.

As described above, the transmitter may transmit the seed value S to the receiver. In one alternative embodiment, the seed value is supplied to the transmitter and the receiver by a third party. In another alternative embodiment, the receiver transmits the seed value S to the transmitter. At any rate, because the transmitter and the receiver use the same seed value, they each generate the same sequence of random vectors.

As described above, the transformation T is a transformation on an N-dimensional space, i.e., the space of vectors having N dimensions where each of the dimensions in the vector contains at least one element. The elements of the vectors may be real numbers, rational numbers, integers, complex numbers, etc. In various embodiments, the transformation T may be a discrete Fourier transform (e.g., a Fast Fourier Transform), a discrete cosine transform, a Gabor transform, a wavelet transform, a Walsh-Hadamard transform or any other transform that results in the least number of active signal components. The transformation T may be linear transformation is some embodiments and a nonlinear transformation in others.

As described above, the receiver is configured to receive the value k from the transmitter (see line 313 of FIG. 3). In one alternative embodiment, the receiver is configured to compute k, e.g., by an analysis of transform vector t=T(u). For example, as the iteration index i increases the value of k may become more apparent as the noise level in vector t drops toward zero, leaving k dominant elements t(j) that stand out of the noise level.

While the transmitter is shown in FIG. 2 as generating the random vectors sequentially (see the loop comprising lines 207-211), it is understood that the task of generating the random vectors may just as well be parallelized by delegating portions of this task to separate processing devices. Similarly, the receiver may parallelize the effort of generating the random vectors.

As described above, the receiver may repeat the operations corresponding to lines 320-334 until the condition d<Q is satisfied. Other termination conditions are contemplated. For example, in one alternative embodiment, the receiver may analyze the d value from the current iteration and one or more previous iterations to determine a maximum of those d values, and terminate when that maximum is less than Q. In another alternative embodiment, the receiver may compute the average of the d value from the current iteration and one or more previous iterations, and terminate when that average is less than Q. In yet another alternative embodiment, the receiver may compute an average and standard deviation of d values, and terminate when the average plus some multiple of the standard deviation is less than Q. In yet another alternative embodiment, the receiver may terminate after having iterated a specified number of times, e.g., when $i \geq i_{max}$. The number $i_{max}$ may be determined at design time by the system designer, or may be determined by user input, or may be computed based parameters such as N and k, etc.

In some embodiments, the receiver computes a closeness value c instead of a separation value d between y[i] and f. In these embodiments, the termination condition may have the form c>Qc, where Qc is a threshold for closeness. In one embodiment, the receiver computes a closeness value according to the relation: c=|y[i]|/(|y[i]|+|y[i]−f|).

While the signal X was assumed above to be a member of class C(T,k) for some transformation T and some integer k, the above described methodology for estimating signal X may provide partial benefit even when this assumption is relaxed.

In some embodiments, the signal X is assumed to be a zero-mean signal.

In other embodiments, the signal X is not assumed to be a zero-mean signal. For example, in one embodiment, the transmitter may compute the DC component $a_{dc}$ of the signal X, transmit the DC component $a_{dc}$ to the receiver, generate a zero-mean signal $X_z$ by subtracting the DC component $a_{dc}$ from the signal X, and then generate and transmit samples of the zero-mean signal $X_z$ as described above (e.g., as shown in FIG. 2). The receiver may estimate the zero-mean signal $X_z$ based on the samples as described above (e.g., as shown in FIG. 3) and then add the DC component $a_{dc}$ to obtain an estimate for the original signal X. As an alternative to transmitting the DC component $a_{dc}$, the transmitter may generate a DC signal vector A of length N and having all elements equal to $a_{dc}$; generate a random vector r; compute the dot product $m_{dc}$=A·r; and transmit the dot product $m_{dc}$ to the receiver. The receiver may receive the dot product $m_{dc}$; generate the same random vector r; count the number $b_r$ of ones in the random vector r; and estimate the DC component $a_{dc}$ based on the expression $a_{dc}=m_{dc}/b_r$.

In some embodiments, the above-described methodology may be used as a form of encryption/decryption as long as the seed value S is not publicized. The stream of values m generated by the transmitter is interpreted as the encrypted data that represents the signal X.

In some embodiments, the samples generated by the transmitter may be stored for estimation/reconstruction of the signal X at a later time. The samples may be interpreted as a compressed representation of the signal X.

As time progresses, it is possible that new and/or improved transformations may be discovered, e.g., transformations for which the transformed signal T(X) will be even more sparse than with any currently existing transformations. The present invention contemplates the use of such new and/or improved transformations.

Figure 5:
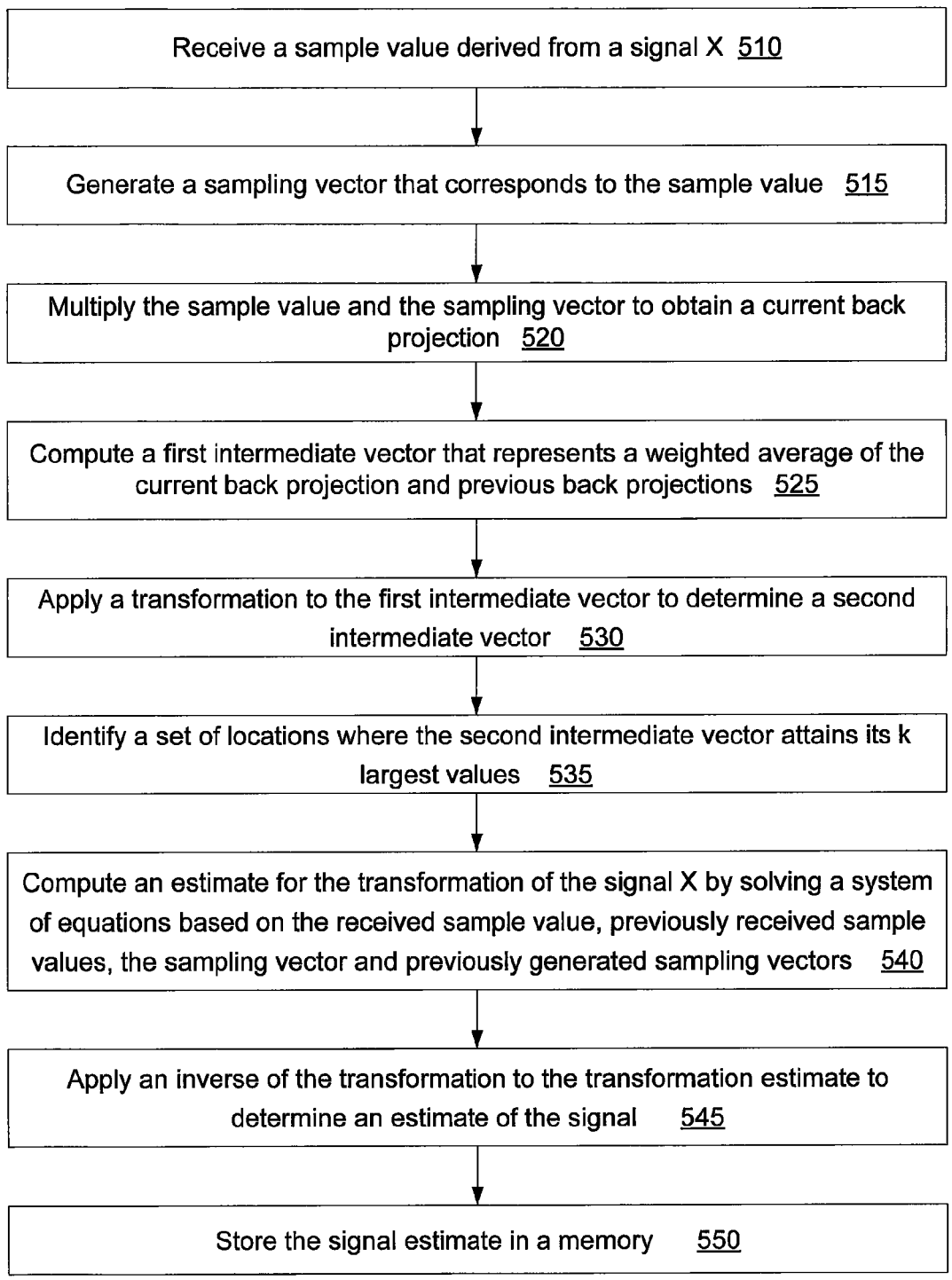
FIG. 5 is a flowchart for one embodiment of a method for estimating the signal X based on received samples.

In one set of embodiments, a method for estimating a signal X may involve the set of operations illustrated in FIG. 5.

As indicated at 510, a sample value may be received, e.g., from the transmitter 110 as described above. The sample is derived from the signal X, e.g., as described above in connection with FIG. 2.

As indicated at 515, a sampling vector that corresponds to the sample value may be generated. The generated sampling vector may be identical to the sampling vector that the transmitter used to compute the sample value. In one embodiment, the sampling vector is a random vector having binary values, e.g., a vector generated by repeated use of a random number generator. In another embodiment, the sampling vector is a low discrepancy sequence having binary values.

As indicated at 520, the sample value and the sampling vector may be multiplied to obtain a current back projection.

As indicated at 525, a first intermediate vector that represents an average (e.g., a weighted average) of the current back projection and previous back projections may be computed. In one embodiment, the first intermediate vector may be computed as discussed above in connection with lines 324 and 325 of FIG. 3.

As indicated at 530, a transformation may be applied to the first intermediate vector to determine a second intermediate vector. The transformation is a linear or non-linear transformation.

As indicated at 535, a set of locations where the second intermediate vector attains its k largest values (e.g., in terms of absolute value) may be identified, where k is a positive integer. As noted above, the parameter k may be computed (e.g., based on an analysis of the second intermediate vector) and provided by some external agent such as the transmitter 110.

As indicated at 540, an estimate for the transformation of the signal X may be computed by solving a system of equations based on the set of locations, the received sample value, previously received sample values, the sampling vector and previously generated sampling vectors. The system of equations may be linear or nonlinear. In one embodiment, the system of equations is a k×k linear system, where the k×k linear system of equations is based on: the set of locations, the received sample value; k−1 previously received sample values; the sampling vector; and k−1 previously generated sampling vectors.

As indicated at 545, an inverse of the transformation may be applied to the transformation estimate to determine an estimate of the signal.

As indicated at 550, the signal estimate may be stored in a memory.

In some embodiments, the signal X may be a zero-mean signal.

The signal X may be any desired type of signal. In one embodiment, the signal X may be an image (e.g., a digital image). In various other embodiments, the signal X may be a digitized version of an electrical signal, an audio signal, a video signal, a signal obtained from a measurement system, a communication signal, a seismic signal, an acoustic signal, a magnetic resonance signal, a radar signal, etc.

In one embodiment, the above-described method may also include the act of displaying a graphical representation of the signal estimate via a display device (e.g., a monitor, television, a projector, a head-mounted signal, a liquid crystal display, a plasma display, etc.).

In one embodiment, the above-described method may also include the act of providing the signal estimate to an audio output device for conversion into an audio output signal.

In one embodiment, the above-described method may also include: operating on the signal estimate to extract information from the signal estimate; and providing the information to an output device (e.g., a display device, an audio output device, a network interface, etc.).

It is noted that any of the method embodiments described herein (or, any combination of the method embodiments described herein, or, any subset of any of the method embodiments described herein) may be encoded in terms of a set of program instructions from any known programming language. That set of program instructions may be stored on a computer-readable memory medium, e.g., a CD-ROM, a magnetic disk or tape, a semiconductor-based memory such as any of various kinds of RAM and/or ROM, paper, film, an array of programmable switches, an array of nanoparticles, an array of features generated by imprint lithography, etc. Thusly stored, those program instructions will be executable by one or more processors to implement the given method embodiment (or the given combination of method embodiments, or the given subset of a method embodiment). Furthermore, a computer system may be configured to include such a memory medium and one or more processors, where the program instructions stored on that memory medium are executable by the one or more processors to implement the given method embodiment (or the given combination of method embodiments, or the given subset of a method embodiment). The computer system may be realized in any of various forms. For example, the computer system may be a personal computer (in any of its various forms), a workstation, a computer on a card, a server computer, a client computer, a computer system embedded in a sensor or control device or data acquisition system, a laptop computer, a handheld device, etc.

It is noted that any of the method embodiments described herein (or, any combination of the method embodiments described herein, or, any subset of any of the method embodiments described herein) may be implemented in terms of a hardware configuration program for a programmable hardware element. The programmable hardware element may be configured or programmed to produce a device capable of implementing the given method embodiment (or the given combination or the given embodiment subset).

It is noted that any of the method embodiments described herein (or, any combination of the method embodiments described herein, or, any subset of any of the method embodiments described herein) may be implemented in terms of dedicated hardware, e.g., as an ASIC, a set of one or more ASICS, a circuit comprising discrete logic devices, etc.

In one set of embodiments, a computer-readable memory medium stores program instructions that are executable by one or more processors to: (a) receive a data value, where the data value provides information regarding a signal to be estimated; (b) generate a random vector that corresponds to the data value; (c) multiply the data value and the sampling vector to obtain a current back projection; (d) compute a first intermediate vector that represents a weighted average of the current back projection and previous back projections; (e) apply a transformation to the first intermediate vector to determine a second intermediate vector; (f) identify a set of index positions where the second intermediate vector attains its k largest values in terms of absolute value, where k is a positive integer; (g) compute an estimate for the transformation of the signal by solving a system of equations based on the set of index positions, the received data value, previously received data values, the sampling vector and previously generated sampling vectors; (h) apply an inverse of the transformation to said estimate for the transformation to determine an estimate of the signal; and (i) store the estimate of the signal in memory.

In some embodiments, the signal may be a zero-mean signal.

Any of a wide variety of transformations may be used in various embodiments. For example, in one embodiment, the transformation is a discrete Fourier transformation. In another embodiment, the transformation is a discrete cosine transformation. In yet another embodiment, the transformation is a Gabor transformation. In yet another embodiment, the transformation is a wavelet transformation.

In one embodiment, the transformation of the signal has no more than k non-zero values.

In one embodiment, the transformation is a linear transformation corresponding to a nonsingular N×N matrix, where N is the number of elements (i.e., components) in the signal.

In one embodiment, the transformation may be selected or specified by user input.

Figure 6:
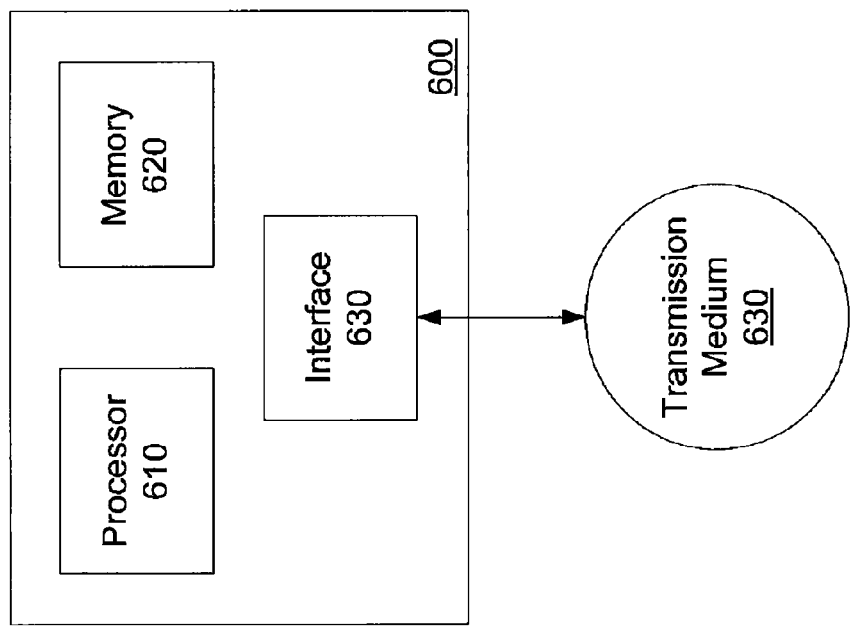
FIG. 6 illustrates one embodiment of a computer system for estimating the signal X based on received samples.

In one set of embodiments, a computer system 600 for estimating a signal may include a processor 610 and memory 620 as shown in FIG. 6. The memory stores program instructions that are executable by the processor to: (a) receive a data value, where the data value provides information regarding a signal to be estimated; (b) multiply the data value and a corresponding sampling vector to obtain a current back projection; (c) compute a first intermediate vector that represents a weighted average of the current back projection and previous back projections; (d) apply a transformation to the first intermediate vector to determine a second intermediate vector; (e) identify a set of index positions where the second intermediate vector attains its k largest values in terms of absolute value, where k is a positive integer; (f) compute a fourth intermediate vector by applying an inverse of the transformation to the third intermediate vector; (g) compute a dot product of the fourth intermediate vector with the random vector; (h) repeat (a) through (h) until a separation between the dot product and the corresponding data value smaller than a threshold value; (k) compute an estimate of the signal using the set of index positions, the received data value, previously received data values, the sampling vector and previous sampling vectors; and (l) store the signal estimate in the memory. Furthermore, the computer system 600 may include an interface for interacting with a transmission medium (e.g., the transmission medium 130 of FIG. 1), e.g., for receiving the sample value.

In some embodiments, the signal may be a zero-mean signal.

In one embodiment, the operation (k) includes: computing an estimate for the transformation of the signal by solving a system of equations based on the set of index positions, the received data value, the previously received data values, the sampling vector and the previous sampling vectors; and applying the inverse of the transformation to said estimate for the transformation to determine the estimate of the signal.

In one embodiment, the separation between the dot product and the corresponding data value is a percentage difference between the dot product and the corresponding data value.

In one embodiment, the transformation of the signal is k-sparse.

In one embodiment, the program instructions are executable to display a graphical representation of the signal estimate via a display device.

Figure 7:
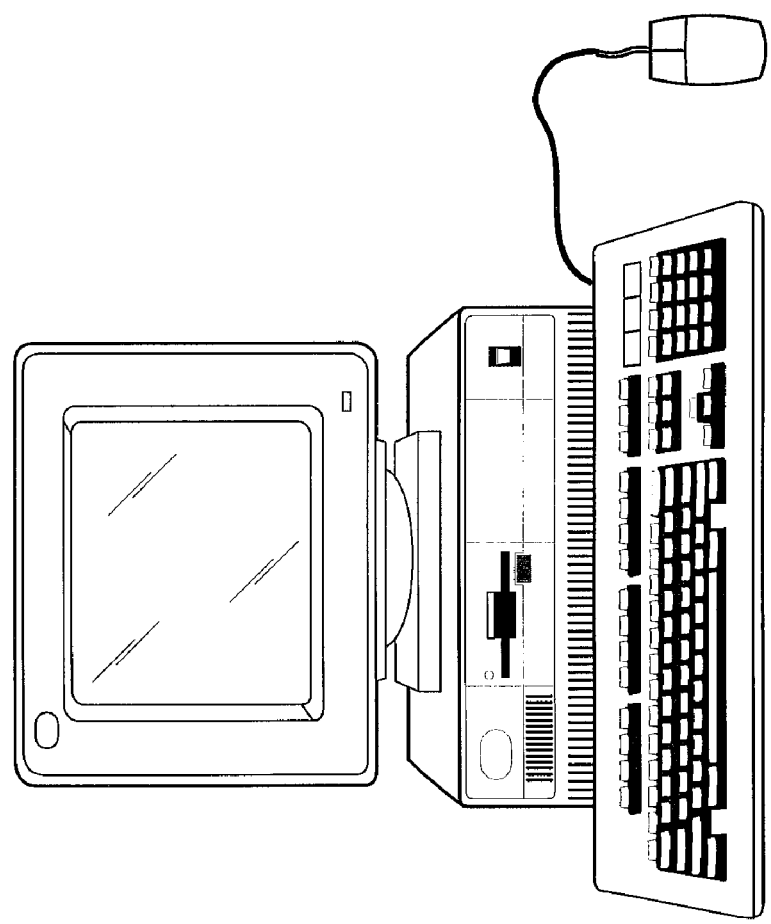
FIG. 7 illustrates one embodiment of a computer system 782 that may be used to implement any of the method embodiments described herein.

FIG. 7—Computer System

FIG. 7 illustrates a computer system 782 operable to execute software programs for estimating a signal X based on a stream of received samples according to any of the various method embodiments described herein. As shown in FIG. 7, the computer system 782 may include a display device operable to display information. The display device may also be operable to display a graphical user interface for user interaction with software and/or hardware that implement any of the method embodiments described herein. The graphical user interface may comprise any type of graphical user interface, e.g., depending on the computing platform.

The computer system 782 may include a memory medium(s) on which may be stored one or more computer programs or software components according to any of the method embodiments described herein. For example, the memory medium may store one or more programs, e.g., graphical programs, which are executable to perform any of the methods described herein. Also, the memory medium may store a programming development environment application used to create and/or execute such programs, e.g., the LabVIEW graphical programming development environment provided by National Instruments Corporation. The memory medium may also store operating system software, as well as other software for operation of the computer system. Various embodiments further include receiving or storing instructions and/or data implemented in accordance with the foregoing description upon a carrier medium.

Figure 8:
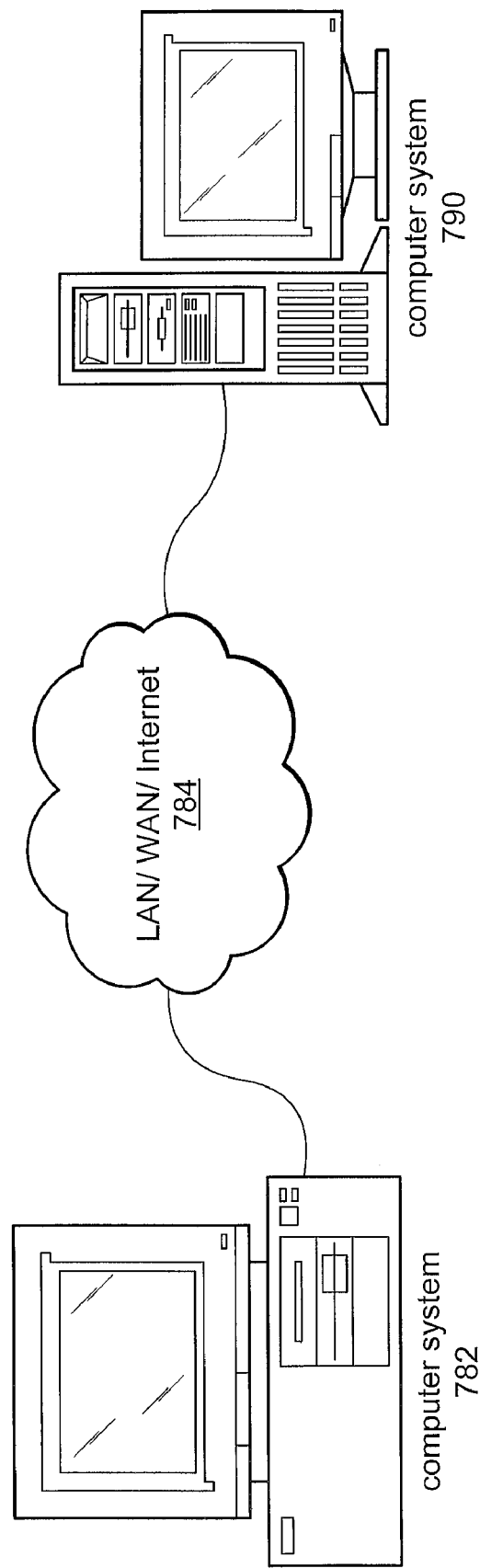
FIG. 8 illustrates a network system comprising two or more computer systems, either (or both) of which may be used to implement any of the method embodiments described herein.

FIG. 8—Computer Network

FIG. 8 illustrates a system including a first computer system 782 that is coupled to a second computer system 790. The computer system 782 may be connected through a network 784 (or a computer bus) to the second computer system 790. The computer systems 782 and 790 may each be any of various types, as desired. The network 784 can also be any of various types, including a LAN (local area network), WAN (wide area network), the Internet, or an Intranet, among others.

In some embodiments, the computer systems 782 and 790 may implement and/or execute software programs in a cooperative or distributed manner. For example, in embodiments that utilize graphical programming methodologies, the computer systems 782 and 790 may execute a graphical program in a distributed fashion. For example, computer 782 may execute a first portion of the block diagram of a graphical program and computer system 790 may execute a second portion of the block diagram of the graphical program. As another example, computer 782 may display the graphical user interface of a graphical program and computer system 790 may execute the block diagram of the graphical program.

In one embodiment, the graphical user interface of the graphical program may be displayed on a display device of the computer system 782, and the block diagram may execute on a device coupled to the computer system 782. The device may include a programmable hardware element and/or may include a processor and memory medium which may execute a real time operating system. In one embodiment, the graphical program may be downloaded and executed on the device. For example, an application development environment with which the graphical program is associated may provide support for downloading a graphical program for execution on the device in a real time system.

In one embodiment, computer system 782 and/or computer system 790 may be configured to estimate a signal X based on received samples according to any of the various method embodiments described herein.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others.

However, it is noted that the present invention can be used for a plethora of applications and is not limited to the above applications. In other words, applications discussed in the present description are exemplary only, and the present invention may be used in any of various types of systems. Thus, the system and method of the present invention is operable to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, e-commerce, games, etc.

Figure 9:
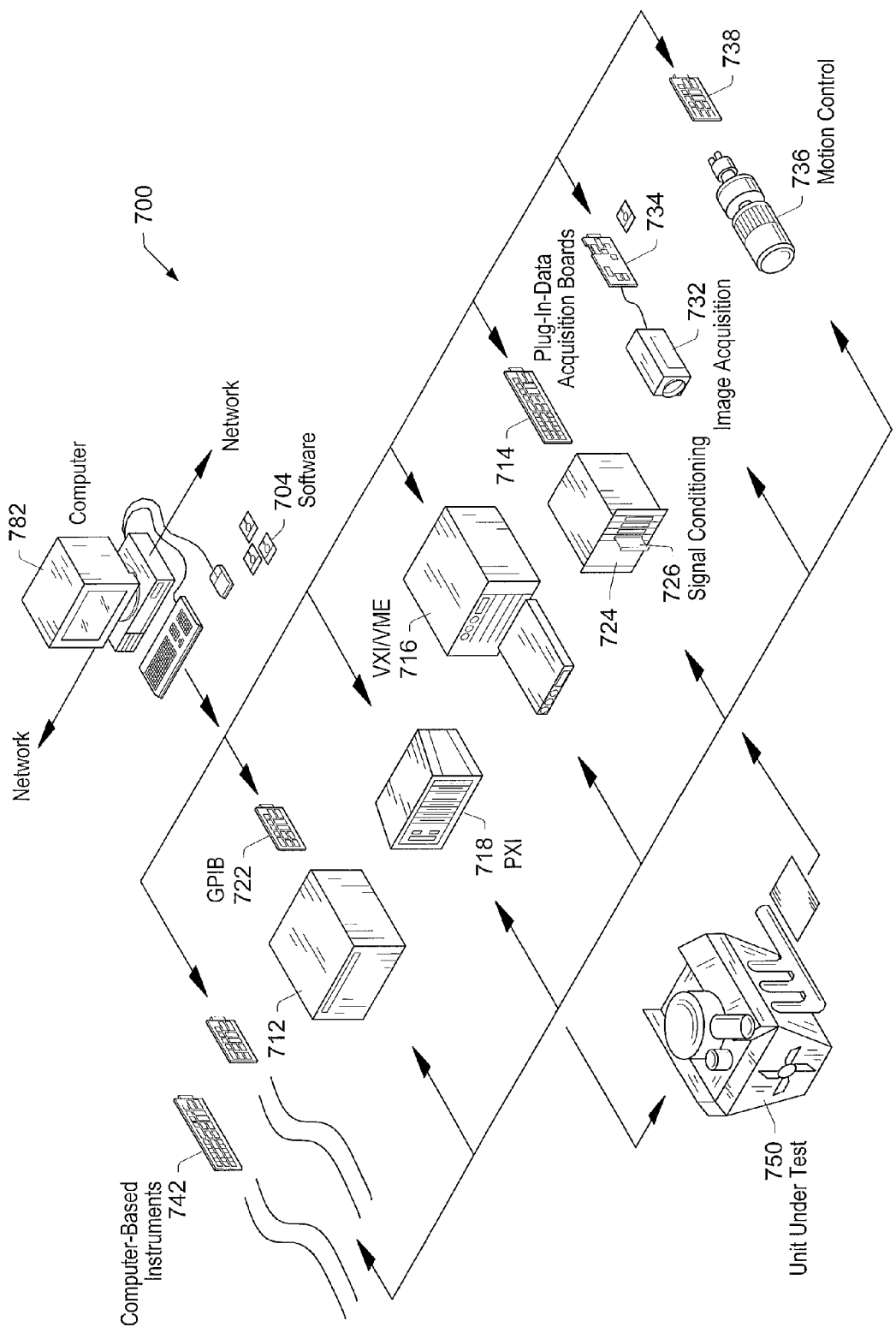
FIG. 9 illustrates one embodiment of an instrumentation control system that may be used to implement any of the method embodiments described herein.

FIG. 9 illustrates an exemplary instrumentation control system 700 which may implement embodiments of the invention. The system 700 comprises a host computer 782 which connects to one or more instruments. The host computer 782 may comprise a CPU, a display screen, memory, and one or more input devices such as a mouse or keyboard as shown. The computer 782 may operate with the one or more instruments to analyze, measure or control a unit under test (UUT) or process 750.

The one or more instruments may include a GPIB instrument 712 and associated GPIB interface card 722, a data acquisition board 714 and associated signal conditioning circuitry 724, a VXI instrument 716, a PXI instrument 718, a video device or camera 732 and associated image acquisition (or machine vision) card 734, a motion control device 736 and associated motion control interface card 738, and/or one or more computer based instrument cards 742, among other types of devices. It is noted that any or all of these instruments may be configured to estimate/reconstruct a signal based on samples using any of the method embodiments described herein.

The computer system may couple to and operate with one or more of these instruments. The instruments may be coupled to a unit under test (UUT) or process 750, or may be coupled to receive field signals, typically generated by transducers. The system 700 may be used in a data acquisition and control application, in a test and measurement application, an image processing or machine vision application, a process control application, a man-machine interface application, a simulation application, or a hardware-in-the-loop validation application, among others.

Figure 10:
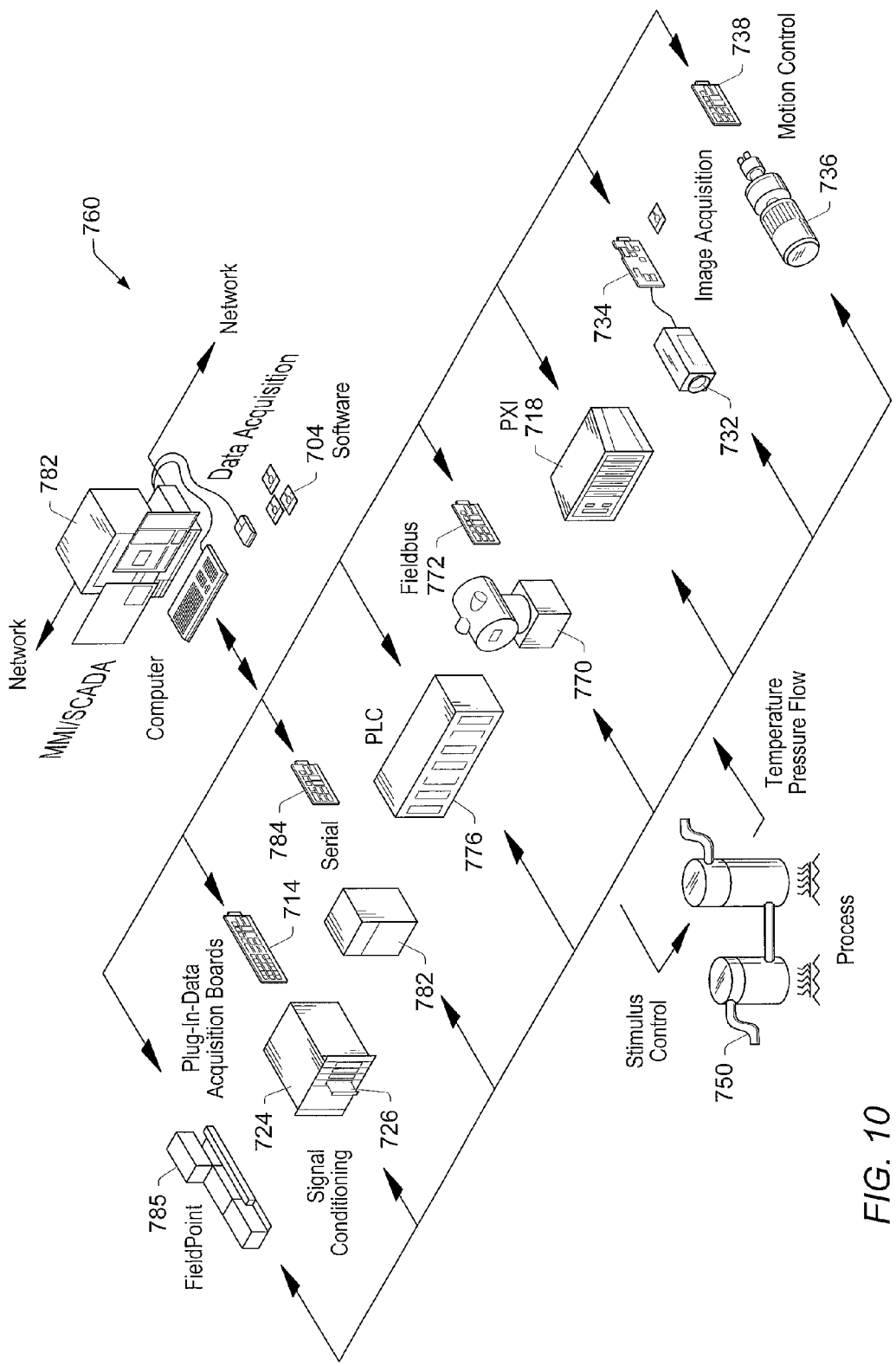
FIG. 10 illustrates one embodiment of an industrial automation system that may be used to implement any of the method embodiments described herein.

FIG. 10 illustrates an exemplary industrial automation system 760 which may implement embodiments of the invention. The industrial automation system 760 is similar to the instrumentation or test and measurement system 700 shown in FIG. 9. Elements which are similar or identical to elements in FIG. 9 have the same reference numerals for convenience. The system 760 may comprise a computer 782 which connects to one or more devices or instruments. The computer 782 may comprise a CPU, a display screen, memory, and one or more input devices such as a mouse or keyboard as shown. The computer 782 may operate with the one or more devices to perform an automation function, such as MMI (Man Machine Interface), SCADA (Supervisory Control and Data Acquisition), portable or distributed data acquisition, process control, advanced analysis, or other control, among others.

The one or more devices may include a data acquisition board 714 and associated signal conditioning circuitry 724, a PXI instrument 718, a video device 732 and associated image acquisition card 734, a motion control device 736 and associated motion control interface card 738, a fieldbus device 770 and associated fieldbus interface card 772, a PLC (Programmable Logic Controller) 776, a serial instrument 782 and associated serial interface card 784, or a distributed data acquisition system, such as the Fieldpoint system available from National Instruments Corporation, among other types of devices. It is noted that any or all of these devices may be configured to estimate/reconstruct a signal based on received samples according to any of the various method embodiments described herein.

In the embodiments of FIGS. 9 and 10 above, one or more of the various devices may couple to each other over a network, such as the Internet. In one embodiment, the user operates to select a target device from a plurality of possible target devices for programming or configuration using a graphical program. Thus the user may create a graphical program on a computer and use (execute) the graphical program on that computer or deploy the graphical program to a target device (for remote execution on the target device) that is remotely located from the computer and coupled to the computer through a network.

Graphical software programs which perform data acquisition, analysis and/or presentation, e.g., for measurement, instrumentation control, industrial automation, modeling, or simulation, such as in the applications shown in FIGS. 9 and 10, may be referred to as virtual instruments.

Figure 11:
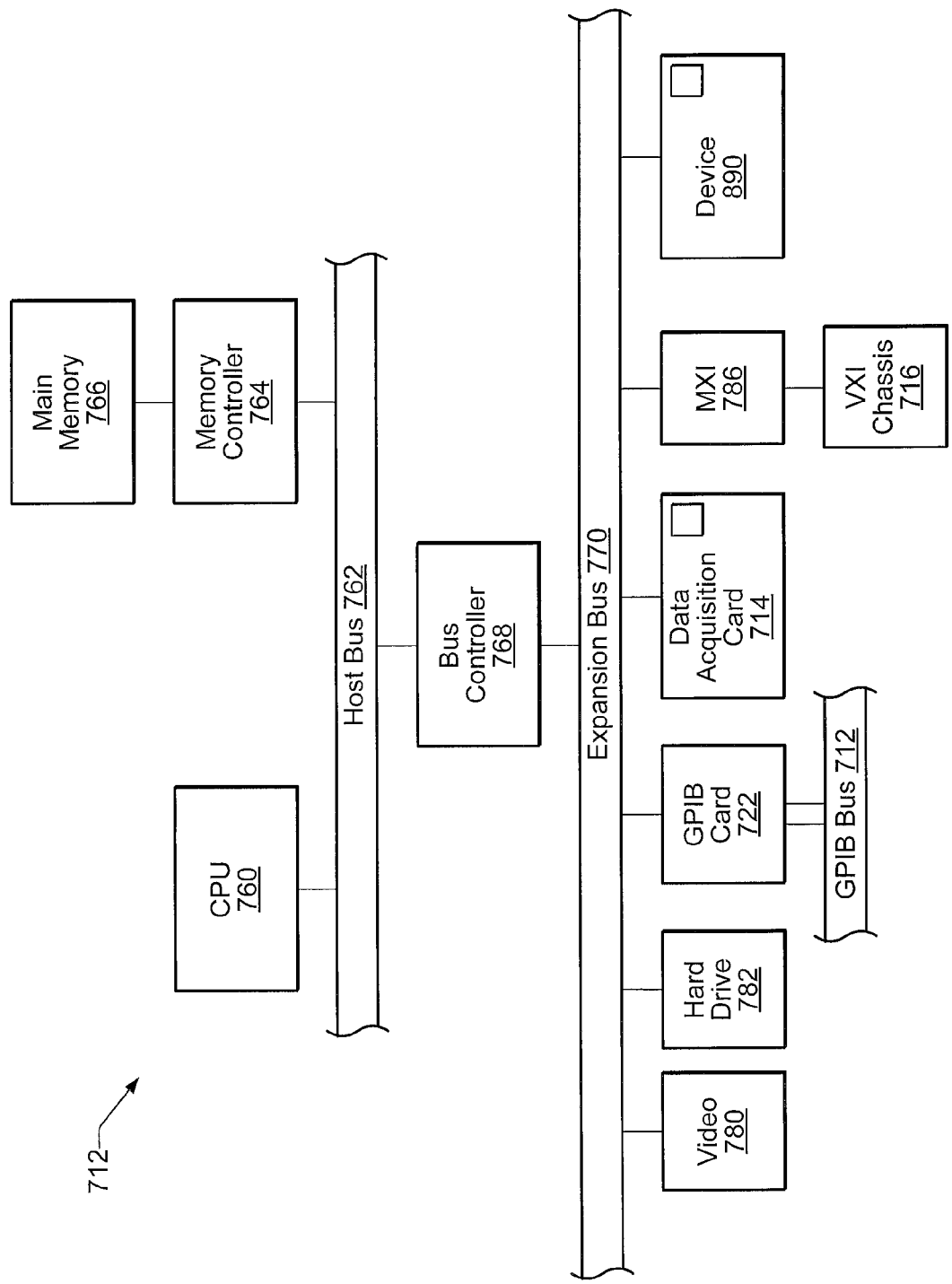
FIG. 11 is an exemplary block diagram for any of the computer systems of FIGS. 7, 8, 9 and 10.

FIG. 11—Computer System Block Diagram

FIG. 11 is a block diagram representing one embodiment of the computer system 782 and/or 790 illustrated in FIGS. 7 and 8, or computer system 782 shown in FIGS. 9 or 10. It is noted that any type of computer system configuration or architecture can be used as desired, and FIG. 11 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 760 which is coupled to a processor or host bus 762. The CPU 760 may be any of various types, including an x86 processor, e.g., a Pentium class, a PowerPC processor, a CPU from the SPARC family of RISC processors, as well as others. A memory medium, typically comprising RAM and referred to as main memory 766 is coupled to the host bus 762 by means of memory controller 764. The main memory 766 may store graphical programs, as well as software according to any of the method embodiments described herein. The main memory may also store operating system software, as well as other software for operation of the computer system.

The host bus 762 may be coupled to an expansion or input/output bus 770 by means of a bus controller 768 or bus bridge logic. The expansion bus 770 may be the PCI (Peripheral Component Interconnect) expansion bus, although other bus types can be used. The expansion bus 770 includes slots for various devices such as described above. The computer 782 further comprises a video display subsystem 780 and hard drive 782 coupled to the expansion bus 770. The computer 782 may also comprise an MXI device 786 coupled to a VXI chassis 716.

As shown, a device 890 may also be connected to the computer. The device 890 may include a processor and memory that may execute a real time operating system. The device 890 may also or instead comprise a programmable hardware element. The computer system may be operable to deploy a program to the device 890 for execution of the program on the device 890. As noted above, in some embodiments, the program may be a graphical program. For example, the deployed graphical program may take the form of graphical program instructions or data structures that directly represent the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer system for estimating a signal, the computer system comprising:
   a processor; and memory storing program instructions that are executable by the processor to:
   (a) receive a data value, wherein the data value provides information regarding a signal to be estimated;
   (b) multiply the data value and a corresponding sampling vector to obtain a current back projection;
   (c) compute a first intermediate vector that represents an average of the current back projection and previous back projections;
   (d) apply a transformation to the first intermediate vector to determine a second intermediate vector;
   (e) identify a set of index positions where the second intermediate vector attains its k largest values in terms of absolute value, wherein k is a positive integer;
   (f) compute a fourth intermediate vector by applying an inverse of the transformation to the third intermediate vector;

(g) compute a dot product of the fourth intermediate vector with the random vector;

(h) repeat (a) through (h) until a separation between the dot product and the corresponding data value smaller than a threshold value;

(k) compute an estimate of the signal using the set of index positions, the received data value, previously received data values, the sampling vector and previous sampling vectors; and (l) store the signal estimate in the memory.

2. The computer system of claim 1, wherein (k) includes:

computing an estimate for the transformation of the signal by solving a system of equations based on the set of index positions, the received data value, the previously received data values, the sampling vector and the previous sampling vectors; and applying the inverse of the transformation to said estimate for the transformation to determine the estimate of the signal.

3. The computer system of claim 1, wherein the separation between the dot product and the corresponding data value is a percentage difference between the dot product and the corresponding data value.

4. The computer system of claim 2, wherein the transformation of the signal is k-sparse.

5. The computer system of claim 2, wherein the program instructions are executable to:

display a graphical representation of the signal estimate via a display device.

* * * * *